INVENTOR.
ROBERT W. ASTHEIMER

Dec. 1, 1970    R. W. ASTHEIMER    3,544,988
PICTURE MOTION DETECTION SYSTEM
Filed Dec. 22, 1966    2 Sheets-Sheet 2

INVENTOR.
ROBERT W. ASTHEIMER
BY *Joseph Levinson*
ATTORNEY

United States Patent Office 3,544,988
Patented Dec. 1, 1970

3,544,988
PICTURE MOTION DETECTION SYSTEM
Robert W. Astheimer, Westport, Conn., assignor to Barnes Engineering Company, Stamford, Conn., a corporation of Delaware
Filed Dec. 22, 1966, Ser. No. 603,932
Int. Cl. G08b *13/18, 13/14*
U.S. Cl. 340—282                                    2 Claims

ABSTRACT OF THE DISCLOSURE

A sensor head includes an illuminator which projects a beam of radiation toward a cylindrical mirror which is mounted on an object whose displacement is to be detected, and reflected by the mirror to a receiver which is located in a common housing with the illuminator. The receiver includes a lined reticle and an infrared detector which generates a transient signal on movement of the object on which the mirror is mounted, which signal is utilized to actuate an alarm.

BACKGROUND OF THE INVENTION

This invention relates to the detection of small movements of objects of value using infrared radiation and detection for actuating a suitable alarm.

Museums, art galleries, businesses, and residences are being increasingly troubled by thievery and vandalism with respect to art objects, antiques, heirlooms, etc. It is difficult, if not prohibitively expensive, to hire and maintain enough guards to keep an alert watch. There exists a need for some type of automatic sensor which will provide an alarm if an object, such as a picture, is moved or tampered with. It is also desirable that such a sensing system involve a minimum of attachments to the objects to be monitored, and that no wiring be required. The present invention provides a solution to this problem with a simple, yet highly efficient optical motion sensor which is well suited for the performance of this purpose, and can be produced in quantity at low cost.

SUMMARY OF THE INVENTION

In carrying out this invention in one illustrative embodiment thereof, an infrared sensor head is provided which is comprised of an illuminator and a receiver. The illuminator projects a beam of infrared radiation onto a mirror which is mounted on an object whose motion is desired to be detected, and the radiation is reflected by the mirror to the receiver. The receiver includes a reticle having a series of transparent and opaque lines, and an infrared detector. Movement of the object on which the mirror is mounted modulates the radiation applied to the detector, producing a pulsed signal which is amplified and utilized to trigger an alarm.

DESCRIPTION OF THE PREFERRED EMBODIMENT

The preferred embodiment of this invention will be described in connection with the detection of small displacements of pictures, although it will be understood that the invention is applicable to other larger unique objects of value, such as sculptures, antiques, and heirlooms.

Figure 1:
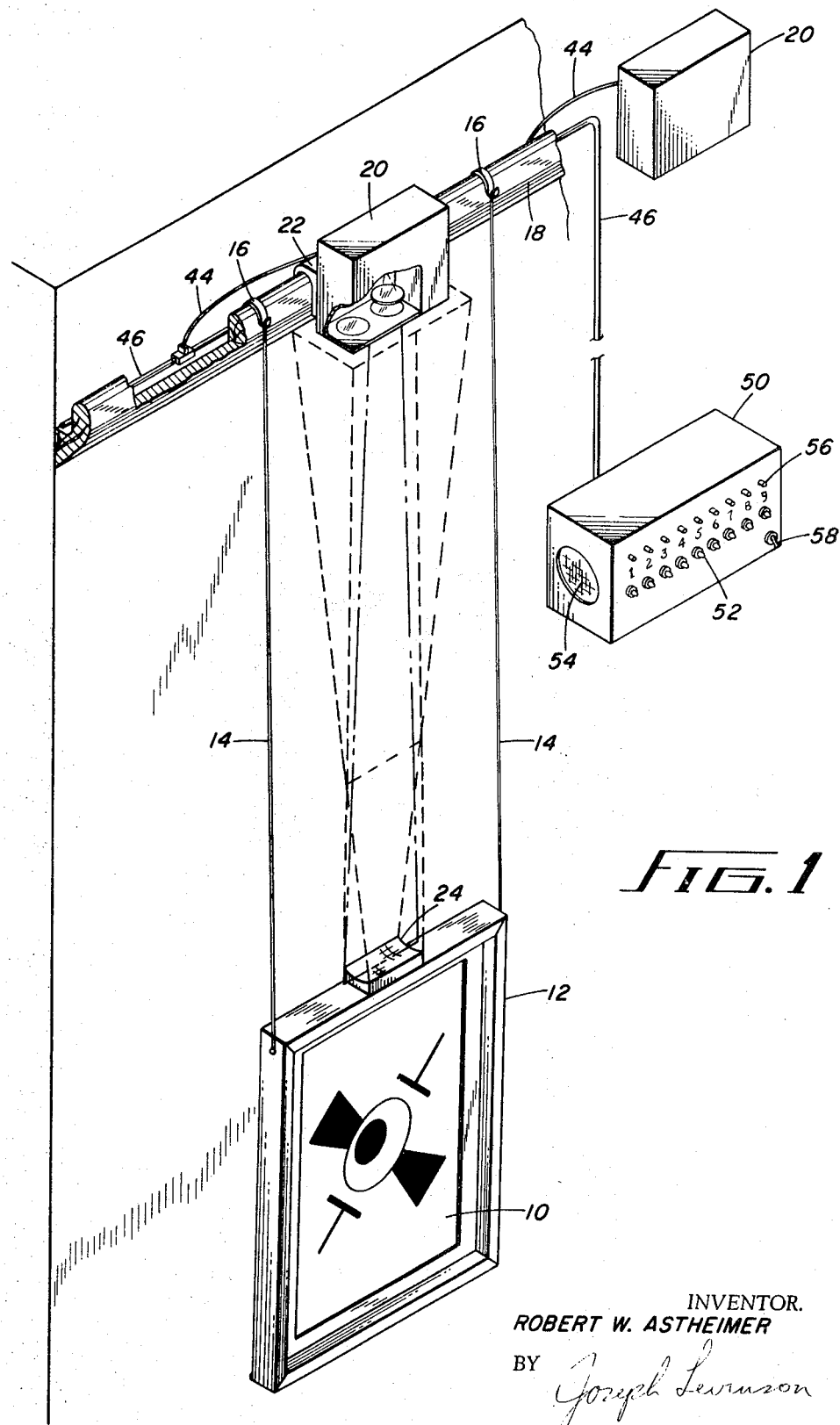
FIG. 1 is an isometric view of the displacement alarm system embodied in this invention as applied to the detection of small displacements of pictures.

FIG. 1 illustrates the system of the invention as applied for the detection of movement of pictures. A picture 10 mounted in a frame 12 is supported by a pair of parallel wires 14, attached by clasps 16 to a molding 18 which extends along the wall near the ceiling of a room. The bottom edge of the picture frame 12, which is hung in the manner shown, usually bears against the wall on the lower corners of the frame, while the top of the picture tips slightly outward, away from the wall. A picture hung in this fashion in which the top of the picture tips slightly outward from the wall is extremely sensitive to tilting in the direction normal to the wall. A sensor head 20, which is mounted by a clamp 22 onto the molding 18, in cooperation with a cylindrical mirror 24, which is mounted on top of the picture frame, is utilized to detect movement of the picture.

Figure 2:
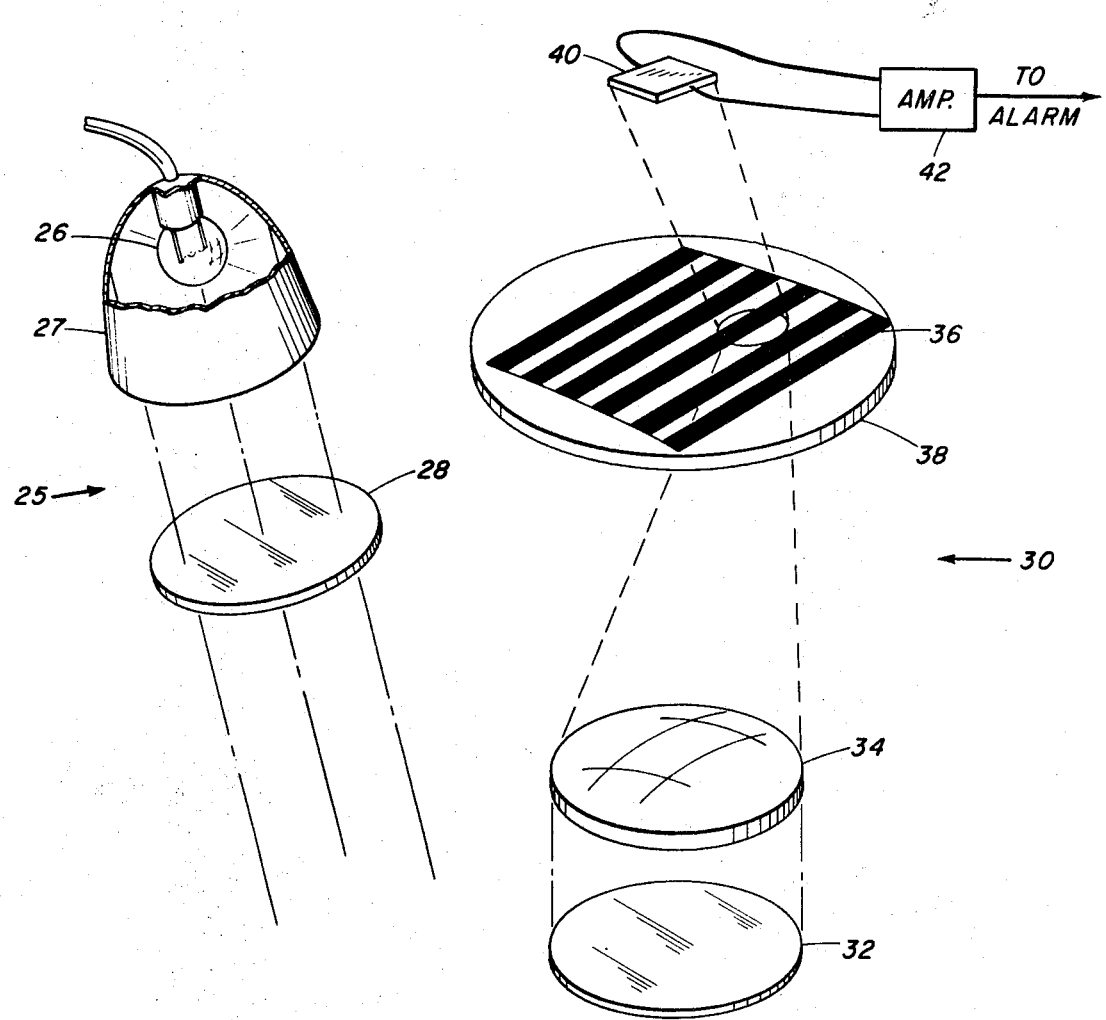
FIG. 2 is a diagrammatic view of the optical arrangement embodied in this invention.
Figure 2:
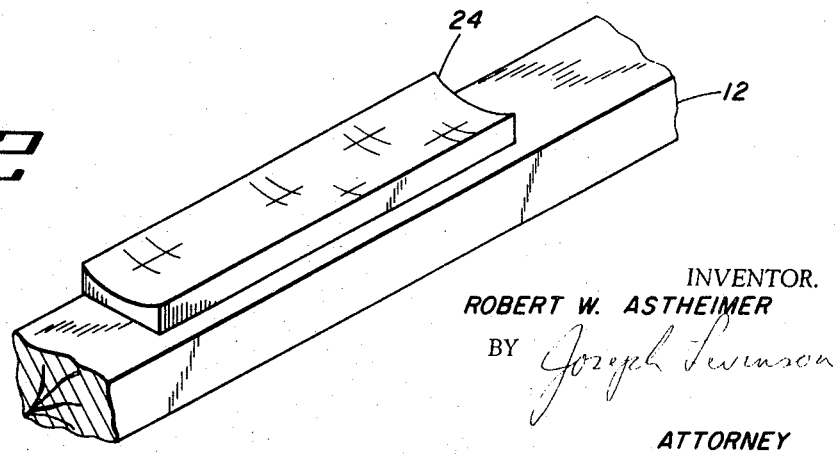

Referring now to FIG. 2, which shows the details of the sensor head 20, which includes an illuminator 25 and a receiver 30. The illuminator 25 is comprised of a source of radiation 26 and a reflector 27, and an infrared filter 28. The receiver 30 includes an infrared filter 32, a receiver lens 34, a reticle 36, a field lens 38, and an infrared detector 40. The infrared detector 40 may be of any suitable type such as lead sulfide, and is connected to A.C. amplifier 42, which is also conveniently housed in the sensor head 20. The cylindrical mirror 24 is the only part of the system contacting the picture. The mirror 24 is concave to produce greater divergence of the radiation so that the placement of the receiver 30 is not critical. A convex mirror would produce the same effect, but in such a case would form a virtual image of the illuminator 25 behind the mirror 24, while if a concave mirror is used, a real image is projected upward toward the receiver. The sensitivity to motion is improved by making the image as close as possible to the receiver 30, which is why the concave mirror is shown in the preferred embodiment, although either a concave or plane mirror could be used. The illuminator 25 projects a beam of infrared radiation downward toward the top edge of the picture frame 12 on which the small cylindrical concave mirror 24 is mounted. The sensor head 20 is positioned from 8 to 12 feet from the top of the picture 10, and the illuminated area provided by the illuminator 25 is approximately 8 inches in diameter, making the placement of the mirror 24 not overly critical. The infrared filter 28 is used to block out visible light so as not to make it objectionable to viewers. The infrared radiation reflected by the small cylindrical mirror 24 is collected by the receiver 30 through the infrared filter 32 and a receiver lens 34, and is focused by the lens 34 on the reticle 36. The reticle is comprised of a series of transparent and opaque lines on a glass plate. The spacing of the series of transparent and opaque lines on the reticle determines the minimum amount of movement which will be detected. Merely as an example, a receiver lens positioned 8 feet from the picture and having a 3-inch focal length utilizing a standard commercially available 300-line per inch ruling which has an open spacing between bars of .002 inch, will detect a displacement of $\frac{1}{32}$ inch at the top of a six-foot picture. This displacement will produce full modulation and produce a pulse on the detector 40. Greater motion will cause the image to move over a number of bars, and will produce a train of pulses, which of course is not essential, as one pulse will be sufficient to actuate an alarm. The collecting lens 38 concentrates the radiation passing through the reticle onto the detector, where a signal is produced. The detector 40 is connected to an A.C. amplifier 42 which will transmit only pulses caused by movement of the picture.

As is seen in FIG. 1, the sensor head 20 is connected to a central alarm 50. The transmission line 46 applies both power and a connection to the centralized alarm circuit 50. A plurality of sensor heads 20 may be connected to the same transmission line for using a common central alarm. The central alarm station 50 may include as many alarms as is desired. The central alarm station 50 is housed in a single enclosure with readouts indicating in which room a picture is moved. The alarm may include an audible as well as a visible signal. The central alarm system 50 may be part of an alarm which is already in existence, or may be connected to such an alarm. The central alarm 50 may include a series of signal lamps 52 indicating the location of the picture which is moved as well as an audible signaling device 54. Reset switches 56 are also included to recondition the system after an alarm has been set off. The central station also includes an on-off power switch 58.

Summarizing the operation of the system, if for any reason the picture 10 is moved, the mirror 24 will move and rotate, thereby causing the spot of invisible radiation which is projected by the illuminator 25 on the receiver to move on the reticle 36. The movement of this spot of radiation across the clear and opaque lines on the reticle 26 causes the radiation intensity on the detector 40 to change. The infrared detector 40 converts this change to an electrical signal which is amplified by the A.C. amplifier 42 which is sent down the transmission line 46 to the central alarm 50, producing a visible and/or audible alarm which indicates the location of the movement. The system may be made compatible with existing alarm systems, and the alarm systems themselves are considered to be conventional.

I claim:
1. A picture motion detection system for detecting small displacements of pictures comprising
 (a) an illuminator and an infrared filter for projection a beam of infrared radiation in a predetermined direction,
 (b) a concave cylindrical mirror mounted on a picture frame whose movement is desired to be detected which is positioned in the path of the beam of infrared radiation from said illuminator to form a real line image of said illuminator,
 (c) a receiver including optical means, a reticle having a series of alternating transparent and opaque bars, and an infrared detector in optical alignment, said optical means focusing said infrared radiation reflected from said concave cylindrical mirror through said reticle and onto said infrared detector,
 (d) an alternating current amplifier connected to said detector, and
 (e) an alarm connected to said alternating current amplifier which is activated by the movement of said picture.

2. The picture motion detection system set forth in claim 1 wherein said optical means of said receiver includes an infrared filter.

References Cited

UNITED STATES PATENTS

| | | | |
|---|---|---|---|
| 2,202,060 | 5/1940 | Mitchell | 340—258B |
| 2,929,956 | 3/1960 | Jacobs et al. | 250—237G |
| 3,248,548 | 4/1966 | Booth et al. | 250—199UX |
| 3,384,754 | 5/1968 | Albarda | 250—237G |
| 2,883,649 | 4/1959 | King | 340—190 |
| 1,458,165 | 6/1923 | Coblentz | 250—83.31 |
| 2,715,851 | 8/1955 | Derr | 250—296 |

FOREIGN PATENTS 898,719 5/1945 France _____ 340—282

THOMAS B. HABECKER, Primary Examiner

J. M. BOBBITT, Assistant Examiner

U.S. Cl. X.R.

250—237, 83.3